US011922759B2

(12) United States Patent
Batsiokis

(10) Patent No.: US 11,922,759 B2
(45) **Date of Patent: *Mar. 5, 2024**

(54) SYSTEMS AND METHODS OF ELECTRONIC GAMING

(71) Applicant: Aristocrat Technologies Australia PTY Limited, North Ryde (AU)

(72) Inventor: Amy Batsiokis, Marsfield (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 594 days.

This patent is subject to a terminal disclaimer.

(21) Appl. No.: 17/119,644

(22) Filed: Dec. 11, 2020

(65) Prior Publication Data

US 2021/0097805 A1 Apr. 1, 2021

Related U.S. Application Data

(63) Continuation of application No. 15/273,948, filed on Sep. 23, 2016, now Pat. No. 10,867,467.

(30) Foreign Application Priority Data

Sep. 23, 2015 (AU) ................................ 2015903881

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3213* (2013.01); *G07F 17/3209* (2013.01); *G07F 17/3225* (2013.01); *G07F 17/3246* (2013.01); *G07F 17/3251* (2013.01); *G07F 17/3258* (2013.01)

(58) Field of Classification Search

CPC ... G07F 17/32; G07F 17/3211; G07F 17/3214
USPC .................................... 463/1, 20, 22, 25, 30
See application file for complete search history.

(56) References Cited

U.S. PATENT DOCUMENTS

| | | | |
|---|---|---|---|
| 5,704,835 | A | 1/1998 | Dietz, II |
| 6,641,477 | B1 | 11/2003 | Dietz, II |
| 8,298,070 | B2 | 10/2012 | Kato |
| 8,986,102 | B2 | 3/2015 | Vandaele |
| 9,129,480 | B2 | 9/2015 | Nakamura |

(Continued)

OTHER PUBLICATIONS

Office Action dated May 29, 2020 for U.S. Appl. No. 15/273,948 (pp. 1-13).

(Continued)

*Primary Examiner* — Adetokunbo O Torimiro
(74) *Attorney, Agent, or Firm* — Armstrong Teasdale LLP

(57) ABSTRACT

Systems, methods, and articles of manufacture for electronic gaming are disclosed. In a first aspect, a gaming system may implement a method of electronic gaming. The method may include selecting a first plurality of symbols, displaying the first plurality of symbols in a first column of symbol display positions, selecting a second plurality of symbols, displaying the second plurality of symbols in a second column of symbol display positions, determining that the first plurality of symbols satisfies a symbol change condition, and replacing, in response to the determining that the first plurality of symbols satisfies the symbol change condition, the first plurality of symbols with a first plurality of jackpot symbols.

20 Claims, 6 Drawing Sheets

(56) References Cited

U.S. PATENT DOCUMENTS

| | | | |
|---|---|---|---|
| 9,378,628 | B2 | 6/2016 | Johnson |
| 2006/0189381 | A1 | 8/2006 | Daniel |
| 2006/0281525 | A1 | 12/2006 | Borissov |
| 2007/0024002 | A1 | 2/2007 | McMain |
| 2009/0005168 | A1 | 1/2009 | Frohm |
| 2010/0029381 | A1 | 2/2010 | Vancura |
| 2010/0190544 | A1 | 7/2010 | Thomas |
| 2013/0237307 | A1 | 9/2013 | Wotton |
| 2014/0235319 | A1 | 8/2014 | Meyer |
| 2015/0018070 | A1 | 1/2015 | Meyer |
| 2015/0105136 | A1 | 4/2015 | Delekta |
| 2015/0105137 | A1 | 4/2015 | Delekta |
| 2015/0105138 | A1 | 4/2015 | Delekta |
| 2015/0235510 | A1 | 8/2015 | Meyer |
| 2015/0310699 | A1 | 10/2015 | Meyer |
| 2016/0042597 | A1 | 2/2016 | Olive |
| 2016/0253873 | A1 | 9/2016 | Olive |
| 2017/0032611 | A1 | 2/2017 | Luong |
| 2017/0193738 | A1 | 7/2017 | Meyer |

OTHER PUBLICATIONS

Notice of Allowance dated Aug. 27, 2020 for U.S. Appl. No. 15/273,948 (pp. 1-5).

SYSTEMS AND METHODS OF ELECTRONIC GAMING

CROSS-REFERENCE TO RELATED APPLICATIONS

This application is a continuation of, and claims the benefit of priority to, U.S. patent application Ser. No. 15/273,948, filed Sep. 23, 2016, entitled "SYSTEMS AND METHODS OF ELECTRONIC GAMING", now U.S. Pat. No. 10,867,467, which claims the benefit of priority to Australian Provisional Patent Application No. 2015903881, filed Sep. 23, 2015, the entire contents and disclosure of which are hereby incorporated by reference in their entirety.

BACKGROUND

The subject matter of the present disclosure relates to a method of electronic gaming, an electronic gaming system, and an article of manufacture for electronic gaming. Conventional gaming systems may employ symbol-driven jackpots, in which a jackpot prize is awarded based upon a winning combination of symbols. A need exists for alternative gaming systems.

SUMMARY

Systems, methods, and articles of manufacture for electronic gaming are disclosed. In a first aspect, a gaming system may implement a method of electronic gaming. The method may include selecting a first plurality of symbols, displaying the first plurality of symbols in a first column of symbol display positions, selecting a second plurality of symbols, displaying the second plurality of symbols in a second column of symbol display positions, determining that the first plurality of symbols satisfies a symbol change condition, and replacing, in response to the determining that the first plurality of symbols satisfies the symbol change condition, the first plurality of symbols with a first plurality of jackpot symbols.

In another aspect, an electronic gaming system may include a display configured to display a wagering game, a player input interface configured to receive a player input, a credit input mechanism including at least one of a card reader, a ticket reader, a bill acceptor, and a coin input mechanism, the credit input mechanism configured to receive a credit wager, the credit wager initiating play of a base game.

The electronic gaming system may further comprise a game controller and a tangible, non-transitory, computer-readable storage medium having instructions stored thereon that, in response to execution by the game controller, cause the game controller to perform operations comprising selecting a first plurality of symbols, displaying the first plurality of symbols in a first column of symbol display positions, selecting a second plurality of symbols, displaying the second plurality of symbols in a second column of symbol display positions, determining that the first plurality of symbols satisfies a symbol change condition, and replacing, in response to the determining that the first plurality of symbols satisfies the symbol change condition, the first plurality of symbols with a first plurality of jackpot symbols.

In yet another aspect, an article of manufacture a non-transitory, tangible, computer readable storage medium having instructions stored thereon that, in response to execution by a computer-based system configured for electronic gaming, cause the computer-based system to perform operations comprising selecting a first plurality of symbols, displaying the first plurality of symbols in a first column of symbol display positions, selecting a second plurality of symbols, displaying the second plurality of symbols in a second column of symbol display positions, determining that the first plurality of symbols satisfies a symbol change condition, and replacing, in response to the determining that the first plurality of symbols satisfies the symbol change condition, the first plurality of symbols with a first plurality of jackpot symbols.

BRIEF DESCRIPTION OF THE DRAWINGS

An exemplary embodiment of the subject matter disclosed will now be described with reference to the accompanying drawings.

DETAILED DESCRIPTION

Figure 1:
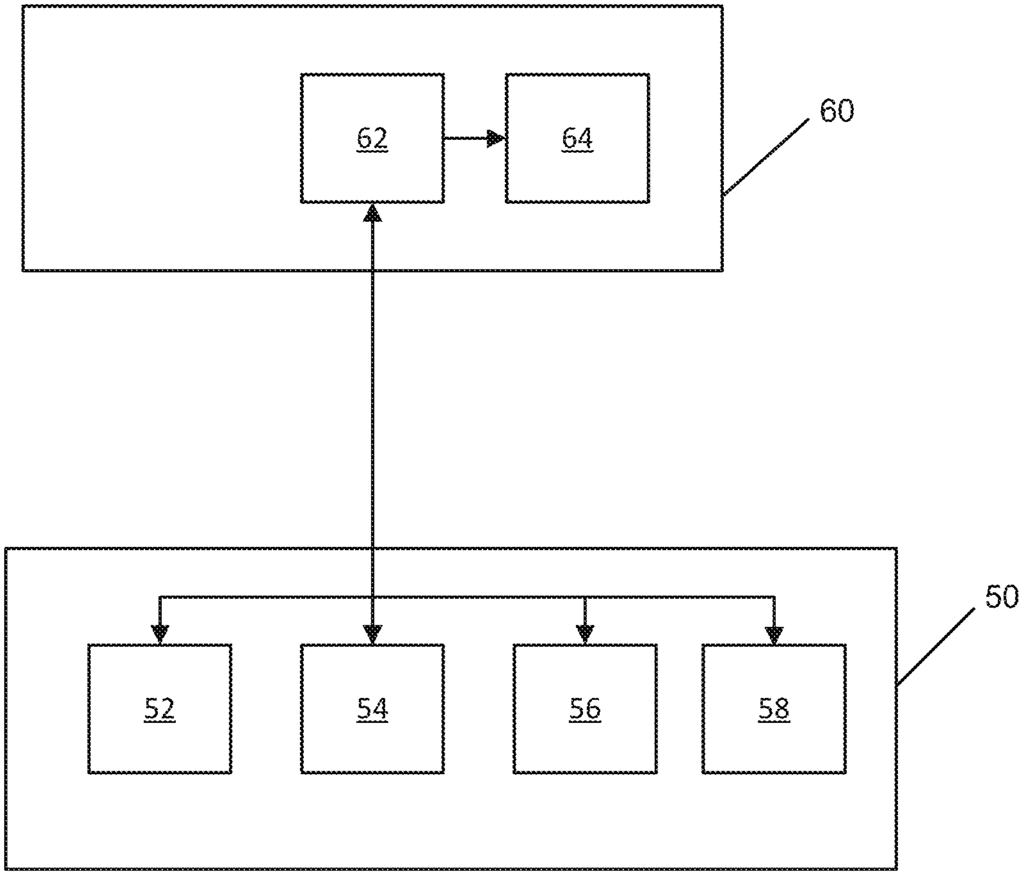
FIG. 1 is a block diagram of the exemplary components of a gaming machine.

Referring to the drawings, a gaming system that includes a game controller is shown. The game controller comprises components that enable the implementation of a game that incorporates various jackpot awards. In one aspect, the game controller may replace a first plurality of selected symbols with a second plurality of selected symbols in response to the occurrence of a symbol change condition. The second plurality of symbols may be associated with a jackpot award and may comprise jackpot symbols. In the exemplary embodiment, the symbol change condition may be that the first plurality of symbols completely occupies a column of symbol display positions.

General Construction of an Exemplary Gaming System

The present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may executed by the server in a thin client configuration.

Figure 2:
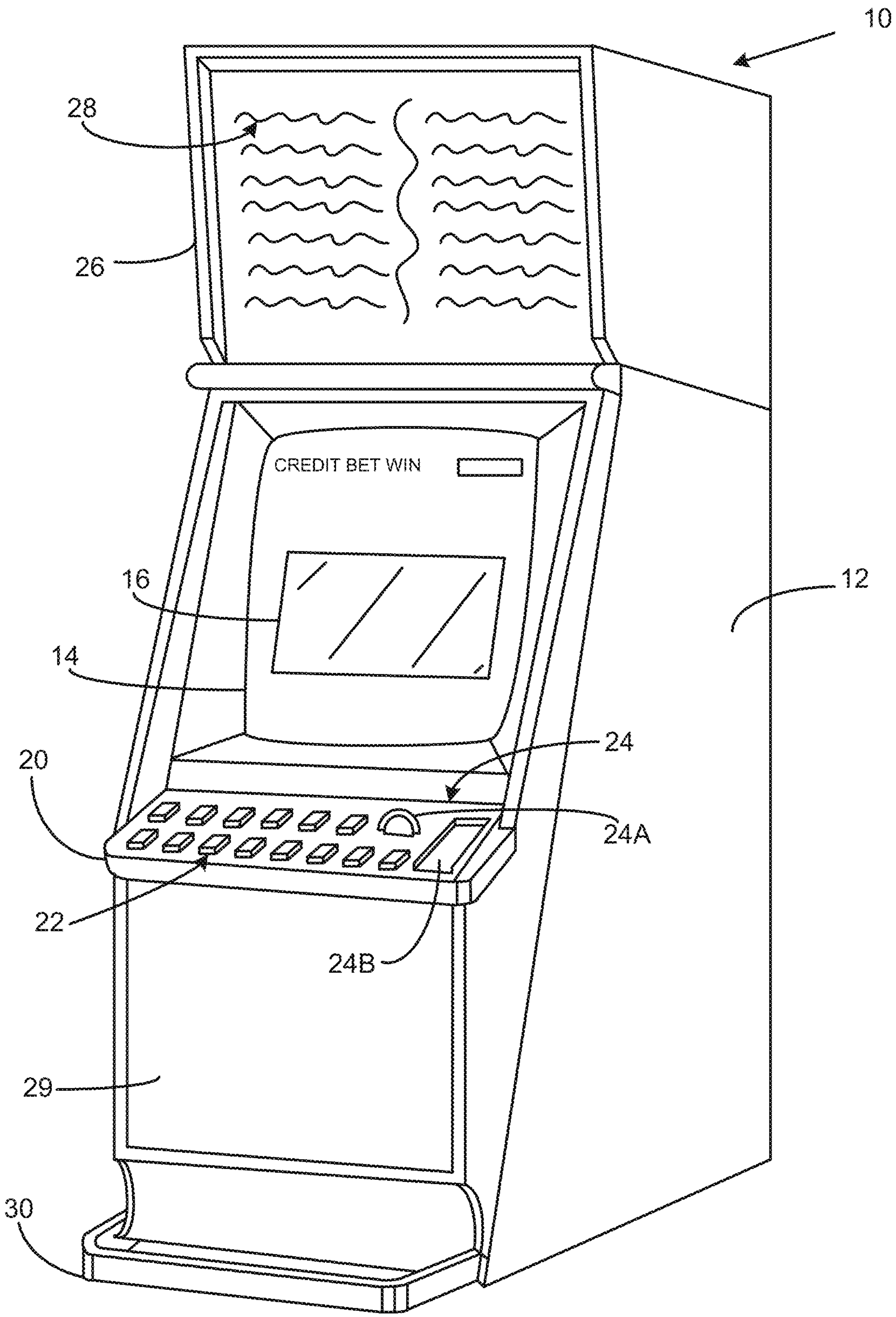
FIG. 2 is a perspective view of an exemplary gaming machine.

FIG. 2 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork 28, such as, for example, artwork depicting one or more pay tables, bonus award information, an upper display (not shown), and/or other game information or imagery. Further artwork and/or information may be provided on a front panel 29 of console 12. A coin tray 30 may be mounted beneath front panel 29 for dispensing cash payouts from gaming machine 10.

Display 14 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or an a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

FIG. 1 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 24, at least one display 14, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 54.

Memory 64 may comprise any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, random or pseudo-random number generators, or numbers generated by a random number of pseudo-random number generator, look-up table data, and/or information and applicable game rules that relate to the play of gaming machine 10.

Figure 3:
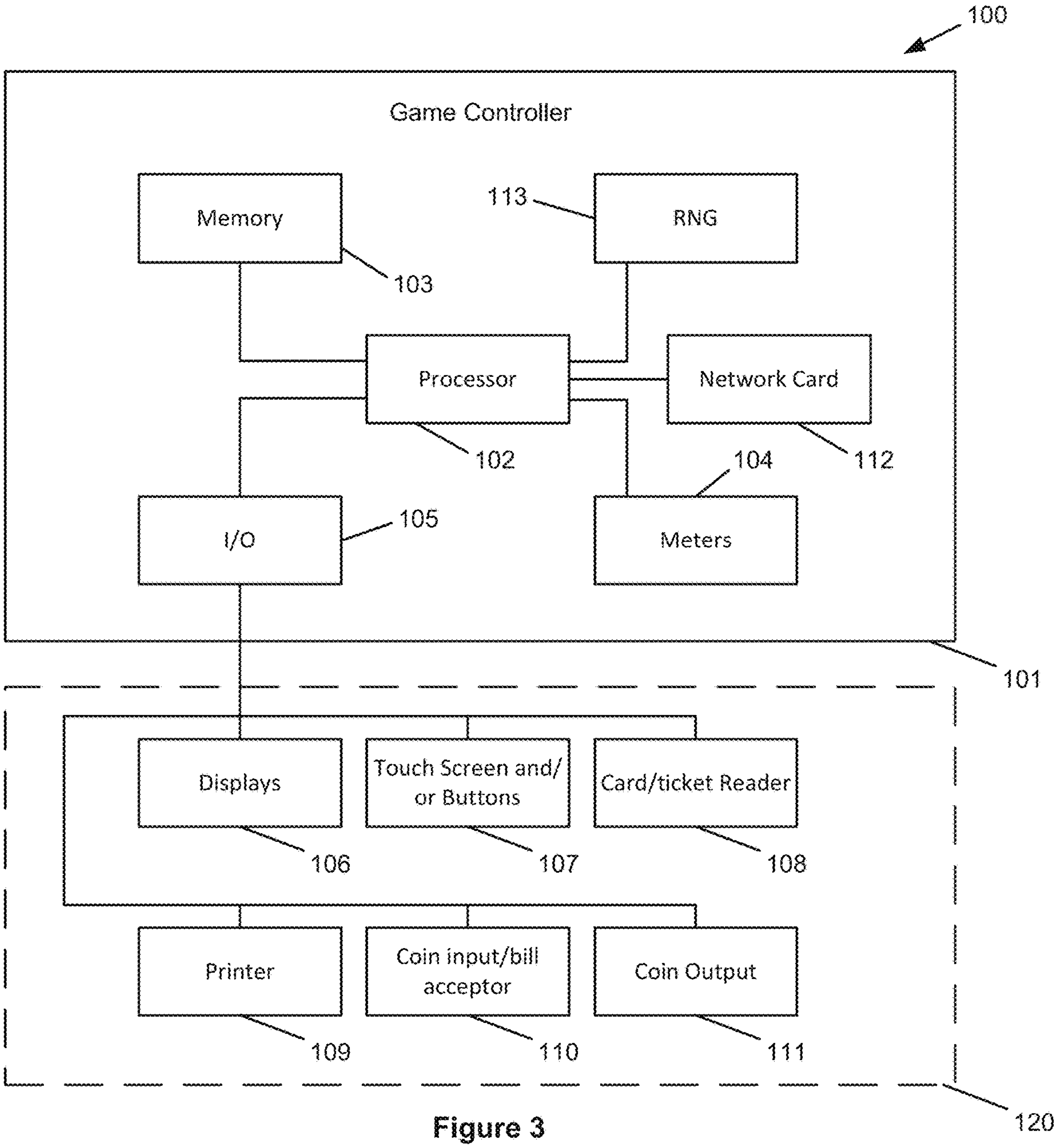
FIG. 3 is a block diagram of exemplary components of a gaming machine.
Figure 4:
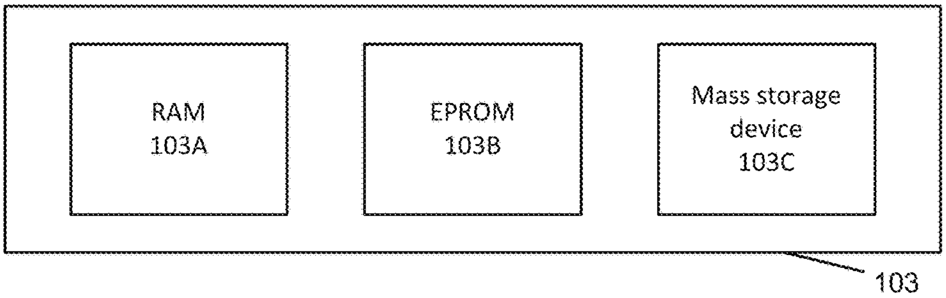
FIG. 4 is a schematic diagram of exemplary components of a memory.

With brief attention to FIG. 4, a block diagram of memory 64 is shown. Memory 64 may, in various embodiments, comprise a memory 103 (as described herein with reference to FIG. 3). Memory 103 may include random access memory (RAM) 103A, such as non-volatile RAM (NVRAM), magnetic RAM (MRAM), ferroelectric RAM (FeRAM) and other forms as commonly understood in the gaming industry. Memory 103 may further include read only memory (ROM), such as EPROM 103B or electrically erasable programmable read only memory (EEPROM). Memory 64 may further include one or more mass storage devices 103C, such as one or more hard drives, one or more solid state or flash memory components, one or more CD and/or DVD drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may comprise a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may comprise a device that has obtained approval from a regulatory gaming commission or a device that has not obtained approval from a regulatory gaming commission. It should also be appreciated that processor 62 and memory 64 may be collectively referred to herein as a "computer" or "controller."

Returning to FIG. 1, in an exemplary embodiment, credit input mechanism 24 may be coupled in communication with processor 62. Credit input mechanism 24 may include any suitable credit input mechanism or device, such as a coin input chute 24A, a bill or ticket collector 24B, and the like. Credit input mechanism may be configured to receive any suitable monetary credit, such as money, coins, tokens, tickets, and the like. In various embodiments, credit input mechanism 24 may further comprise card reader devices, such as credit or debit card readers or validators for credit cards, debit cards, printed ticket printers and/or readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may comprise a game activation device, such as a pull arm or one or more play button 22 that enables the player to start the game or a sequence of events in gaming machine 10. Play button 22 may comprise any suitable play activator such as a bet one button, a max bet button, or a repeat the bet button. In an embodiment, after appropriate funding of gaming machine 10, game play may begin automatically.

In an exemplary embodiment, one input device may comprise a "Bet One" button. A player may place a wager or bet by pushing the Bet One button and may increase the wager by repeatedly depressing or selecting the Bet One button. In various embodiments, an input device comprises a "Bet Max" button that enables a player to place a maximum wager permitted during a particular game or game session.

In various embodiments, an input device may also comprise a "Cash Out" button. A player may depress or select a Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of a Cash Out button.

In various embodiments, an input device may comprise a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

FIG. 3 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from the memory 103, as described below.

Accordingly, gaming machine 100 may include a game controller 101 (which may include a processor 102 mounted on a circuit board, a described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include hardware meters 104 (to ensure regulatory compliance and to monitor player credit) and/or an input/output (I/O) interface 105 (for communicating with peripheral devices of gaming machine 100). Input/output interface 105 and/or the peripheral devices may comprise intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
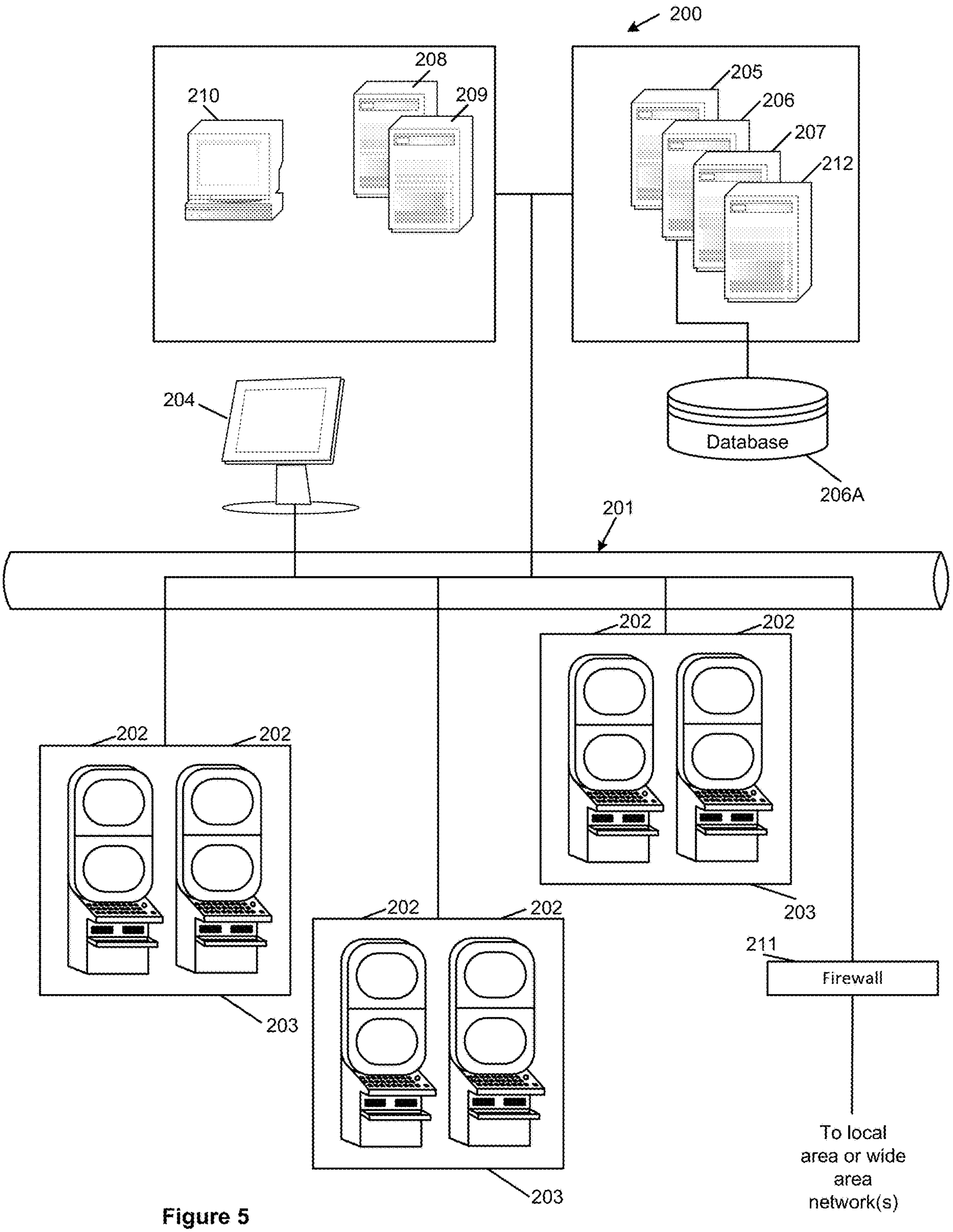
FIG. 5 is a schematic diagram of an exemplary network gaming system.

FIG. 5 illustrates such an exemplary distributed gaming system 200. Gaming system 200 may include a network 201, which, for example, may comprise a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively comprise a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may comprise the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/

SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

Further Details of an Exemplary Gaming System

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may comprise an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

Further, in various embodiments, a player may select a number of reels (virtual or physical) to play. Games of this type are marketed under the trade name "Reel Power" by Aristocrat Leisure Industries Pty Ltd and are also known as "ways" to win games. Such a reel selection option may permit the substitution of one displayed symbol for another. In other words, all symbols displayed at symbol display positions corresponding to a selected reel may be used to form symbol combinations with symbols displayed at designated symbol display positions of the other reels. For example, if there are five reels and three symbol display positions for each reel, such that the symbol display positions comprise three rows of five symbol display positions, the symbols displayed in the center row may be used for non-selected reels. As a result, the total number of ways to win may be determined by multiplying the number of active display positions of each reel, the active display positions being all display positions of each selected reel and the designated display position of the non-selected reels. In this example, for five reels and fifteen display positions, there are 243 ways to win.

As described in greater detail below, a symbol display may comprise a matrix (e.g., a rectangular matrix) of symbol display positions. The matrix of symbol display positions may, in turn, comprise a plurality of columns and a plurality of rows. In various embodiments, the number of symbol display positions associated with a column may vary from one column to the next. For example, in an exemplary embodiment, a symbol display may include five columns, in which the first column, the third column, and the fifth column include three symbol display positions and in which the second and fourth columns include four symbol display positions (e.g., a 3-4-3-4-3 column formation). Such a column formation includes seventeen display positions. Moreover, in such a formation, adjacent columns may be offset or staggered relative to one another.

Figure 6:
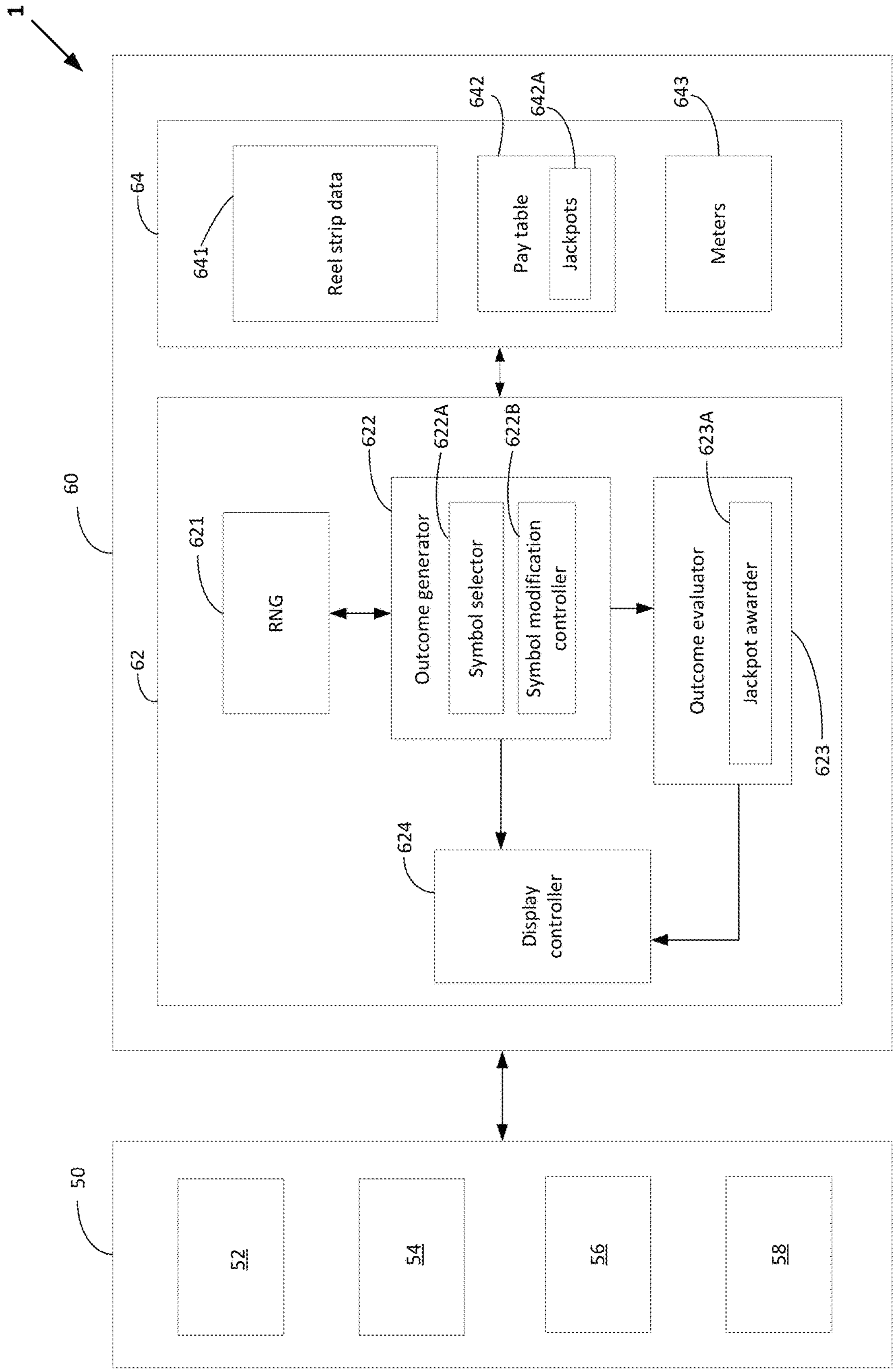
FIG. 6 is a block diagram of an exemplary gaming system.

FIG. 6 illustrates a block diagram of an exemplary gaming system that includes a plurality of software modules. Processor 62 of game controller 60 is shown implementing a number of such modules based on program code and data stored in memory 64. Persons skilled in the art will appreciate that one or more of the modules could be implemented in some other way, such as, for example by a dedicated circuit.

In an exemplary embodiment, the various software modules may include outcome generator 622, which may operate in response to the player's operation of game play mechanism 56 to place a wager, and thereby, initiate game play. Thus, as described herein, a game outcome may be generated and evaluated (e.g., by outcome generator 622 and/or outcome evaluator 623). In the exemplary embodiment, the outcome generator 622 may form the game outcome using a symbol selector 622A to select symbols from a set of symbols specified by symbol data 641 based upon one or more random numbers output by random number generator 621. The selected symbols may be transmitted to display controller 624, which may cause each symbol to be displayed on display 54 at a selected set of symbol display positions.

In an exemplary embodiment, symbol selector 622A may select one or more symbols from a plurality of symbol sets. Each symbol set may be displayed as part of a "reel strip," which, as used herein, may comprise a plurality of symbols displayed within a column of symbol display positions. Symbol selector 622A may thus select a plurality of symbols for display within a matrix of symbol display positions, as described above.

In an exemplary embodiment, some (or all) of the symbols selected by symbol selector 622A may comprise jackpot symbols. Selected jackpot symbols may be used to fill one or more symbol display positions within a plurality of reel strips. In addition, as used herein, a "stack" of symbols may comprise those symbols disposed within a particular column or reel strip. In an exemplary embodiment, a "full stack" of symbols may refer to a column or a reel strip in which each of the symbol display positions comprising the column or reel strip is associated or filled with a particular symbol, such as a jackpot symbol or any other designated symbol.

In an exemplary embodiment, symbol selector 622A may select symbols for display by selecting a stopping position in the sequence of symbols displayed on a reel strip. The number of symbols displayed may depend upon the number of reel strips displayed as well as upon the number of symbols (or symbol display positions) included in each reel strip. For example, a gaming machine that includes five reel strips of four symbols each may display twenty symbols at a time. Similarly, a gaming machine that includes five reel strips of three symbols each may display fifteen symbols at a time. In various embodiments, a probability table stored in memory 64 may be referenced to vary the odds of a particular reel stop position being selected. Other techniques may also be used to control the odds of particular outcomes occurring.

In an exemplary embodiment, at least one reel strip may include a first plurality of symbols (e.g., a first stack or first plurality of first symbols) that may be exchanged with, replaced by, or changed into one or more jackpot symbols (e.g., a first stack or first plurality of jackpot symbols) if a symbol change condition occurs or is met or satisfied. In an embodiment, one or more of the reel strips may include more than one stack of jackpot symbols. In an embodiment, one or more of the reel strips may include more than one stack of designated first symbols (or simply "first symbols"). In an embodiment, at least one reel strip has both of one or more stacks of jackpot symbols and one or more stacks of first symbols. The first symbol may be any suitable symbol, such as any symbol chosen, selected, designated, or pre-defined for symbol change condition status by a game designer.

In response to symbol selection by symbol selector 622A, symbol modification controller 622B may determine whether a symbol modification (such as a symbol change, replacement, or exchange) should be made.

Symbol modification controller 622B may determine whether all of the symbol display positions of at least one column or reel strip are occupied by jackpot symbols. In other words, symbol modification controller 622B may determine whether any reel strip includes a full stack of jackpot symbols. As used herein, a full stack of any particular symbol (e.g., a jackpot symbol) may be referred to as having "landed". Symbol modification controller 622B may also determine whether any reel strip includes a full stack of designated first symbols.

In an embodiment, if both these conditions are met (e.g., if a full stack of jackpot symbols have landed in conjunction with a full stack of designated first symbols), a symbol change condition may be satisfied and symbol modification controller 622B may cause the designated first symbols to change to jackpot symbols. For example, symbol modification controller 622B may exchange or replace one or more designated first symbols with one or more jackpot symbols. The exchange of the designated first symbols with jackpot symbols may be displayed on display 54 under control of display controller 624. In an embodiment, symbol modification controller 622B may replace one or more designated first symbols with one or more jackpot symbols irrespective of whether a full stack of jackpot symbols have landed. For instance, symbol modification controller 622B may simply replace a full stack of designated first symbols with a full stack of jackpot symbols in response to a determination that the designated first symbols correspond to or are associated with a symbol change condition, such as, for example, a condition indicating that the particular first symbols satisfy the change condition when the first symbols land in a full stack. In an embodiment, the symbol change condition is satisfied if replacing at least one of the first symbols with at least one jackpot symbol would satisfy or trigger a jackpot award condition.

In an embodiment, different jackpot awards may correspond to different jackpot award conditions. For example, mini, minor, major, and grand jackpot awards may correspond to two, three, four, or five full stacks jackpot symbols, respectively.

In an alternate embodiment, the symbol change condition may be based upon a random number, such as a random number generated by random number generator 621. For instance, at least one of the designated first symbols may be replaced with at least one jackpot symbol based upon a random number, such as a random number associated with a symbol change condition. Such a symbol change condition may be in addition to or an alternative to a symbol change condition that is satisfied based upon the effect of replacing a first symbol with a jackpot symbol, as described above.

In various embodiments, game controller 62 may also implement or include an outcome evaluator 623, which may evaluate selected symbols based on pay table 642. Outcome evaluator 623 may, in turn, include a jackpot awarder 623A, which may generate the relevant jackpot award from a plurality of jackpots 642A if a jackpot award condition is met.

For example, and as described above, jackpot awarder 623A may generate a jackpot award in response to two or more columns of symbol display positions being entirely occupied by jackpot symbols (after any modification of first symbols). In another embodiment, it may be required that there are three or more columns of symbol display positions occupied by jackpot symbols (after any modification of first symbols) for the jackpot awarder 623 to make an award of one of the jackpots 642A. Where the jackpots are awarded in the form of credits, the jackpot awarder 623A may award the jackpot by updating a meter 643 stored in the memory 64 of the gaming controller 60. In an embodiment, the award of the jackpot may be added to a win meter. In another embodiment, the award of the jackpot may be added directly to a credit meter.

In various embodiments, the first symbols may be changed to, or replaced with, as described above, jackpot symbols in a base game, in a feature game, or any combination of a base game and feature game. As used herein, a base game is a part of the game which is carried out each time the player makes a wager, typically irrespective of the wager, whereas a feature game may be carried out occasionally, such as, for example if a feature gam condition is met such as the occurrence of a feature game trigger (e.g., a jackpot award).

In some embodiments, one or more first symbols may change based upon a player eligibility criterion. A player eligibility criterion may include, for example, that the player has made a certain sized wager, that the player has made an ante bet, that the player gas selected all win lines, that the player has played sufficient games, or that the player is a member of a loyalty program.

Figure 7:
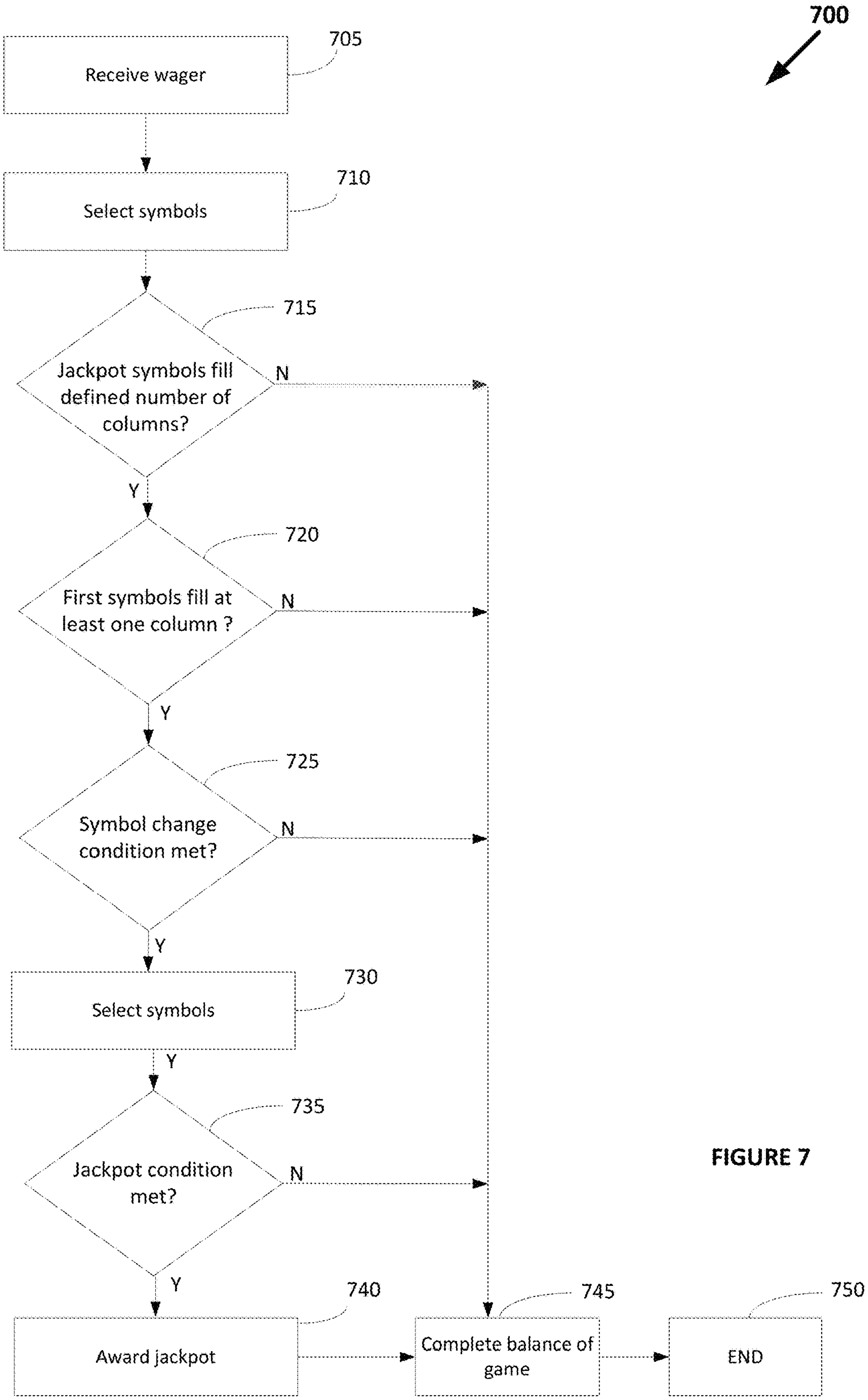
FIG. 7 is a flowchart of an exemplary method of electronic gaming.

FIG. 7 is a flowchart of an exemplary method 700 of electronic gaming. In an embodiment, the method 700 includes receiving a wager (step 705). In response to receipt of the wager, the game controller 60 may deduct the wager from the credit meter, and selects symbols using a process as described above (step 710).

In an embodiment, the game controller 60 may first determine whether the selected symbols include jackpot symbols that fill a defined number of columns (e.g., whether any of the columns or reel strips includes at least one full stack of jackpot symbols) (step 715). If the jackpot symbols do not fill the defined number of columns, the balance of the game may be completed, such as by evaluating the selected symbols relative to a pay table (step 745), after which the game may end (step 750).

If, on the other hand, jackpot symbols fill a defined number of columns, game controller 62 may determine whether a symbol change condition is met (step 725). While this is shown as a separate step in FIG. 7, in some embodiments, the symbol change condition may be satisfied by both of: (a) jackpot symbols filling a defined number of columns and (b) first symbols filling at least one column. Where the symbol change condition is met, the game controller may change the first symbols to jackpot symbols (step 730). The game controller may then determine whether the jackpot condition is met (step 735) based upon an evaluation of the newly exchanged jackpot symbols. If the jackpot condition is met, a jackpot is awarded (step 740) and the balance of the game (step 745) is completed before the game ends (step 750). Again, in an embodiment, there may not need to be a need to separately determine whether a jackpot condition is met, because the symbol change condition may only be met, in such an embodiment, if changing the symbols would result in an award of a jackpot. In other words, in such an embodiment, the same condition being met may result in the award of a jackpot.

Further aspects of the method will be apparent from the above description of the system. It will be appreciated that at least part of the method may be implemented electronically, such as, for example, digitally by a processor executing program tangible, non-transitory, computer-readable program code or instructions that, when executed by the processor, cause the processor to perform operations as described herein, such as in the above description of a game controller. In this respect, in the above description, certain steps are described as being carried out by a processor of a gaming system, it will be appreciated that such steps may require a number of sub-steps to be carried out for the steps to be implemented electronically, such as, for example due to hardware or programming limitations. For example, to carry out a step such as evaluating, determining, or selecting, a processor may compute several values and compare those values.

Example

In an example embodiment, a jackpot award may be triggered by one or more full stacks of jackpot symbols (or "JP"). As described above, a column or reel strip in which all symbol display positions are occupied by a particular symbol, such as a jackpot symbol, comprises a full stack. In some embodiments, one or more stacks may be longer than the number of symbol display positions in a particular column or reel strip.

A "Mini" jackpot may be awarded with any 2 stacks of JP.

A "Minor" may be awarded with any 3 stacks of JP.

A "Major" may be awarded with any 4 stacks of JP.

A "Grand" may be awarded with 5 stacks of JP.

Table 1 below illustrates an example initial outcome of a particular (hypothetical) reel spin. This initial outcome would not result in a jackpot award, because there are not at least two full stacks of JP (and a "Mini" award, which is the least of the four possible jackpot awards, requires at least two full stacks of JP).

TABLE 1

| | | | | |
|---|---|---|---|---|
| P1 | JP | A | P1 | A |
| A | JP | K | P1 | P2 |
| K | JP | P2 | P1 | J |
| J | JP | Q | P1 | K |

However, the initial outcome includes a full stack of a first symbol, P1, which, in this example, satisfies a symbol change condition. More particularly, a symbol change condition may exist in which, if at least one full stack of P1 lands, then one or more of those stacks of P1 may be changed to, or replaced by, one or more full stacks of JP. Such an exchange my occur as the reel strips spin (or appear to spin) and/or after the reel strips have stopped (or have appeared to stop).

Table 2 below illustrates the alterations to Table 1 that would occur in response to replacement of a full stack of P1 with a full stack of JP. Specifically, all the P1 symbols on the fourth reel of Table 1 have changed to JP symbols for the result that a Mini jackpot is generated or won by the player. In another example, as described above, the P1 symbols of Table 2 may only change to JP symbols if a jackpot would not otherwise be awarded (e.g., if, absent the symbol change, no jackpot award, such as a Mini jackpot award, would result).

TABLE 2

| | | | | |
|---|---|---|---|---|
| P1 | JP | A | JP | A |
| A | JP | K | JP | P2 |
| K | JP | P2 | JP | J |
| J | JP | Q | JP | K |

As indicated above, the method may be embodied in program code. The program code may be supplied in a number of ways, for example on a tangible, non-transitory, computer readable storage medium, such as a disc or a memory device, e.g. an EEPROM, (for example, that could replace part of memory 103). Further, different parts of the program code may be executed by different devices, such as, for example in a client server relationship. Persons skilled in the art will appreciate that program code provides a series of instructions executable by the processor.

It will be understood to persons skilled in the art of the disclosure that many modifications may be made without departing from the spirit and scope of the disclosure, in particular it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

What is claimed is:

1. An electronic gaming device comprising:

a display device configured to display at least a first column and a second column of symbol display positions for an electronic game;

a storage medium configured to store a set of symbols including a plurality of jackpot symbols and having instructions stored thereon; and a game controller communicatively coupled to the display device and the storage medium, wherein when executed, the instructions cause the game controller to at least:

select a first plurality of symbols and a second plurality of symbols from the stored set of symbols based on a first random number generated by a random number generator, the first plurality of symbols including a first symbol stack having a full stack of jackpot symbols, the second plurality of symbols including a second symbol stack having at least two adjacent particular symbols;

control the display device to display the first plurality of symbols in the first column and the second plurality of symbols in the second column, thereby presenting an initial unmodified outcome;

determine that a symbol change condition is satisfied, the symbol change condition being an appearance, in the initial unmodified outcome, of the full stack of jackpot symbols of the first symbol stack in conjunction with the second symbol stack of at least two adjacent particular symbols;

control the display device to display a replacement of the second symbol stack with a third symbol stack of jackpot symbols, thereby converting the initial unmodified outcome into a modified outcome based on the replacement; and generate a jackpot award based on the modified outcome.

2. The electronic gaming device of claim 1, wherein the symbol change condition is further based upon a second random number generated by the random number generator.

3. The electronic gaming device of claim 1, wherein the symbol change condition is further based upon a determination that the initial unmodified outcome is improved by the replacing.

4. The electronic gaming device of claim 1, wherein the instructions further cause the game controller to generate the jackpot award based on the first symbol stack and the third symbol stack of jackpot symbols.

5. The electronic gaming device of claim 1, wherein the jackpot award is generated based on a quantity of symbol stacks of jackpot symbols appearing in the modified outcome.

6. The electronic gaming device of claim 5, wherein a first jackpot award is provided for a first quantity of symbol stacks of jackpot symbols appearing in the modified outcome, wherein a second jackpot award that is greater than the first jackpot award is provided for a second quantity of symbol stacks of jackpot symbols appearing in the modified outcome and wherein the second quantity of symbol stacks of jackpot symbols is greater than the first quantity of symbol stacks of jackpot symbols.

7. The electronic gaming device of claim 6, wherein the jackpot award is a mini jackpot award when the quantity of symbol stacks of jackpot symbols is two, a minor jackpot award when the quantity of symbol stacks of jackpot symbols is three, a major jackpot award when the quantity of symbol stacks of jackpot symbols is four, and a grand jackpot award when the quantity of symbol stacks of jackpot symbols is five.

8. An electronic method of gaming implemented using a gaming system, the gaming system including a cabinet, a display device supported by the cabinet and configured to display an electronic game, a random number generator, a tangible, non-transitory, computer-readable memory configured to store a set of symbols, and a game controller enclosed within the cabinet, the method comprising:

selecting a first plurality of symbols and a second plurality of symbols from the stored set of symbols based on a first random number generated by a random number generator, the first plurality of symbols including a first symbol stack having a full stack of jackpot symbols, the second plurality of symbols including a second symbol stack having at least two adjacent particular symbols;

controlling the display device to display the first plurality of symbols in a first column and the second plurality of symbols in a second column, thereby presenting an initial unmodified outcome;

determining that a symbol change condition is satisfied, the symbol change condition being an appearance, in the initial unmodified outcome, of the full stack of jackpot symbols of the first symbol stack in conjunction with the second symbol stack of at least two adjacent particular symbols;

controlling the display device to display a replacement of the second symbol stack with a third symbol stack of jackpot symbols, thereby converting the initial unmodified outcome into a modified outcome based on the replacement; and generating a jackpot award based on the modified outcome.

9. The method of claim 8, wherein the symbol change condition is further based upon a second random number generated by the random number generator.

10. The method of claim 8, wherein the symbol change condition is further based upon a determination that the initial unmodified outcome is improved by the replacing.

11. The method of claim 8, wherein generating the jackpot award is based on the first symbol stack and the third symbol stack of jackpot symbols.

12. The method of claim 8, wherein the jackpot award is generated based on a quantity of symbol stacks of jackpot symbols appearing in the modified outcome.

13. The method of claim 12, wherein a first jackpot award is provided for a first quantity of symbol stacks of jackpot symbols appearing in the modified outcome, wherein a second jackpot award that is greater than the first jackpot award is provided for a second quantity of symbol stacks of jackpot symbols appearing in the modified outcome and wherein the second quantity of symbol stacks of jackpot symbols is greater than the first quantity of symbol stacks of jackpot symbols.

14. The method of claim 13, wherein the jackpot award is a mini jackpot award when the quantity of symbol stacks of jackpot symbols is two, a minor jackpot award when the quantity of symbol stacks of jackpot symbols is three, a major jackpot award when the quantity of symbol stacks of jackpot symbols is four, and a grand jackpot award when the quantity of symbol stacks of jackpot symbols is five.

15. A non-transitory computer-readable storage medium having instructions stored thereon that, when executed by a processor, causes the processor to:

select a first plurality of symbols and a second plurality of symbols from a set of stored symbols based on a first random number generated by a random number generator, the first plurality of symbols including a first symbol stack having a full stack of jackpot symbols, the second plurality of symbols including a second symbol stack having at least two adjacent particular symbols;

control a display device to display the first plurality of symbols in a first column and the second plurality of symbols in a second column, thereby presenting an initial unmodified outcome;

determine that a symbol change condition is satisfied, the symbol change condition being an appearance, in the initial unmodified outcome, of the full stack of jackpot symbols of the first symbol stack in conjunction with the second symbol stack of at least two adjacent particular symbols;

control the display device to display a replacement of the second symbol stack with a third symbol stack of jackpot symbols, thereby converting the initial unmodified outcome into a modified outcome based on the replacement; and generate a jackpot award based on the modified outcome.

16. The non-transitory computer-readable storage medium of claim 15, wherein the symbol change condition is further based upon a second random number generated by the random number generator.

17. The non-transitory computer-readable storage medium of claim 15, wherein the symbol change condition is further based upon a determination that the initial unmodified outcome is improved by the replacing.

18. The non-transitory computer-readable storage medium of claim 15, wherein generating the jackpot award is based on the first symbol stack and the third symbol stack of jackpot symbols.

19. The non-transitory computer-readable storage medium of claim 15, wherein the jackpot award is generated based on a quantity of symbol stacks of jackpot symbols appearing in the modified outcome.

20. The non-transitory computer-readable storage medium of claim 19, wherein a first jackpot award is provided for a first quantity of symbol stacks of jackpot symbols appearing in the modified outcome, wherein a second jackpot award that is greater than the first jackpot award is provided for a second quantity of symbol stacks of jackpot symbols appearing in the modified outcome and wherein the second quantity of symbol stacks of jackpot symbols is greater than the first quantity of symbol stacks of jackpot symbols.

* * * * *